Patented Oct. 28, 1930

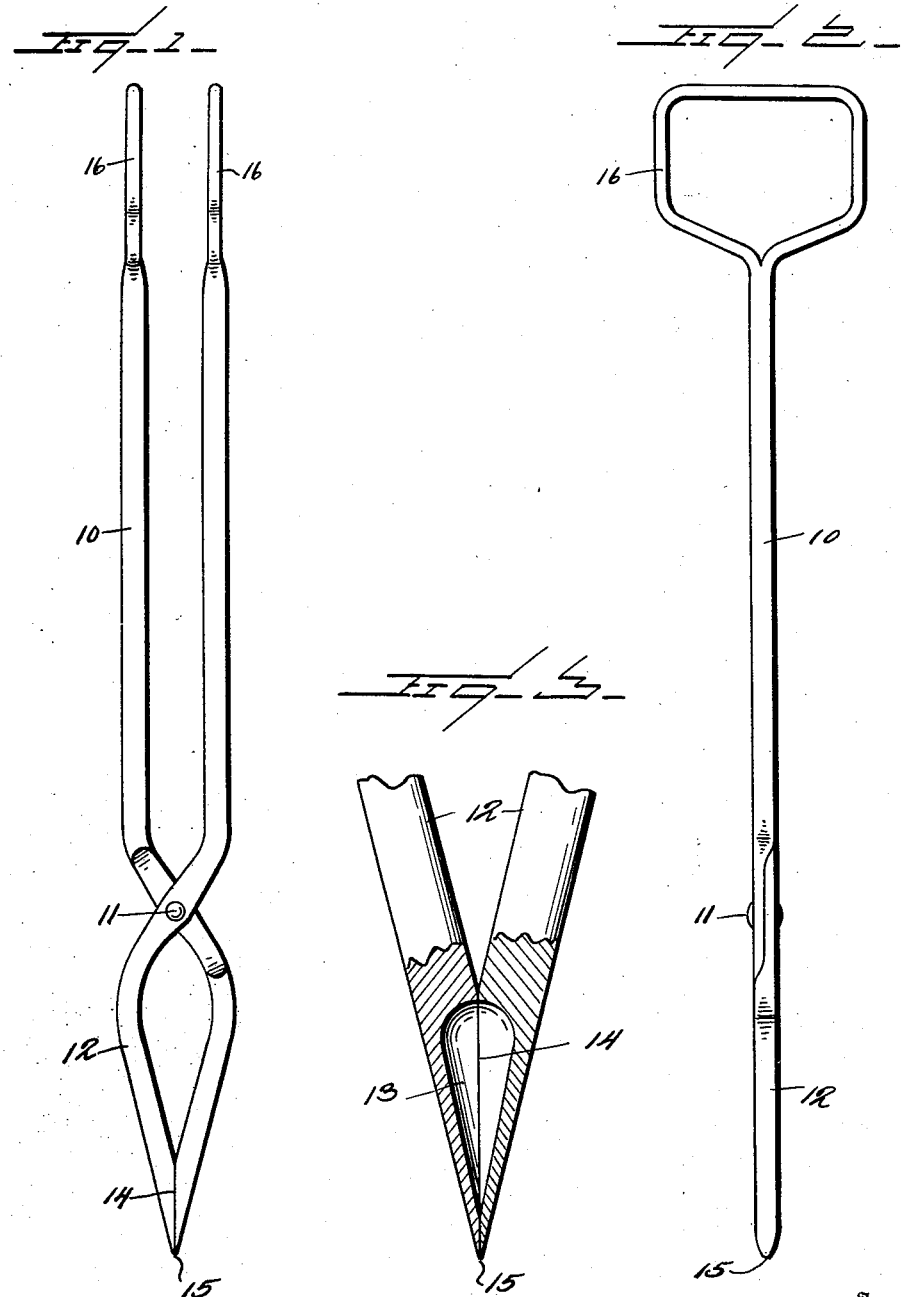

1,779,761

UNITED STATES PATENT OFFICE

JOHN L. ALFORD, SR., OF McDADE, TEXAS

TONGS FOR POISON BAIT

Application filed January 16, 1930. Serial No. 421,224.

The present invention relates to tongs or pincers and more particularly to tongs adapted for use in setting poison bait or the like in the ground.

An object of this invention is to provide a device of this character which will permit handling of poison bait for rodents or the like without touching the hands of the operator of the device.

Another object of this invention is to provide a pair of tongs which are so constructed that they will firmly hold the poison bait therebetween and at the same time the tongs may be pushed or driven into the ground so that the bait may be placed in the desired position.

A further object of this invention is to provide a device which is of sufficient strength that it may be inserted into the ground so as to place the bait in the path of the rodent, the bait being carried by the forward end of the tongs in such position that it will not be disturbed or lost when the end of the tongs enters the ground.

The above and various other objects and advantages of this invention will in part be described in and in part be understood from the following detailed description of the present preferred embodiment, the same being illustrated in the accompanying drawing wherein:—

Figure 1 is a detailed top plan view of a device constructed according to the preferred embodiment of this invention;

Figure 2 is a detailed side elevation of the device; and

Figure 3 is a fragmentary sectional view, partly in elevation, of the device.

Referring to the drawing wherein like numerals of reference designate corresponding parts throughout the several views, the numeral 10 designates generally a pair of handle members which are pivotally connected together by means of a bolt or pivotal member 11 which extends through the outer end portion of the handles 10. The handle members 10 are adapted to intersect each other and are arcuately bent as at 12 so as to provide a pair of jaw members.

The jaw members 12 are provided with pocket or bait receiving members 13 adjacent the outer end portions thereof, and the outer end portions of the jaw members 12 are angularly inclined as at 14, the coacting edges of the jaw members being coaxial with the pivot 11 when in closed position. The outer end portions of the jaw members 12 are substantially pointed as at 15 so that when the jaws are closed, a substantially pointed bait holding member is provided which may be readily inserted in the ground. The jaw members 12 may be substantially elongated in construction and are of sufficient length so as to permit their insertion in the ground to a proper depth so that any bait carried by the pocket members 13 may be placed in the runway of a mole, rat or other rodent which burrows under ground.

The inner end portions of the handle members 10 are provided with loop members 16 which may be formed integrally with the elongated handle 10 or be welded or otherwise secured thereto so as to provide suitable gripping members for operation of the tongs.

If desired, the pocket members 13 may be formed so as to extend upwardly into the jaw members 12 so as to permit the desired quantity of poison bait to be inserted therebetween.

In the use of this device the handle members 10 may be swung outwardly on the pivot 11 thereby coactively opening the jaw members 12 and the outer ends of the jaw members inserted in the poison bait. The handle members may then be swung inwardly thereby closing the jaw members about the bait and forcing the poison bait within the pocket members 13. The opposite edge portions 14 of the pocket members 13 will firmly engage each other so that none of the bait will be lost when the jaw members 12 are forced into the ground. The jaw members 12 may then be forced into the ground in the desired location but preferably in the runway or the like of a rodent which it is desired to exterminate, and when the jaws have been forced downwardly into the ground to the desired depth the handle members 10 may be swung outwardly thereby opening the jaws 12 and permitting the bait in the pocket members 13 to be released therefrom.

The tongs are preferably constructed of metal which is of sufficient strength so that the handle members and the jaw members will not be bent or otherwise injured when the jaws 12 are forced into the ground.

It will, of course, be understood that various changes and modifications may be made in the details of construction and design of the above specifically described embodiment of the invention without departing from the spirit thereof, such changes and modifications being restricted only by the scope of the following claims:

What is claimed is:—

1. A pair of tongs comprising a pair of elongated handle members pivotally secured to each other, and a pair of relatively short and narrow jaw members secured to said handle members and adopted for movement therewith, said jaw members having registering recesses in the outer end portion thereof providing a closed receptacle when the jaws are closed whereby to hold the bait therein against release upon projection of the jaw members into the ground.

2. A pair of tongs of the character described comprising a pair of elongated handle members pivotally secured to each other, said handle members having looped gripping means on the inner ends thereof, and a pair of relatively short and narrow movable jaw members secured to said handle means and adapted for movement therewith, said jaw members having inwardly extending complementary recesses formed in the forward ends thereof and adapted to provide a closed receptacle upon engagement of the jaw members with each other whereby to firmly hold bait therebetween against removal upon projection of the jaw members into the ground.

3. A pair of poison bait tongs of the character described comprising a pair of elongated narrow handle members pivotally secured to each other, gripping means secured to the inner end portions of said handle means, and a pair of narrow and relatively short jaw members outstanding from the forward ends of said handles, said jaw members being angularly inclined with respect to each other and having registering recesses therein extending inwardly from their contacting faces, said recesses being adapted to provide a closed pocket upon closing of the jaw members whereby to prevent release of the bait when the jaws are projected into the ground.

In testimony whereof I hereunto affix my signature.

JOHN L. ALFORD, Sr.